United States Patent Office 3,572,121
Patented Mar. 23, 1971

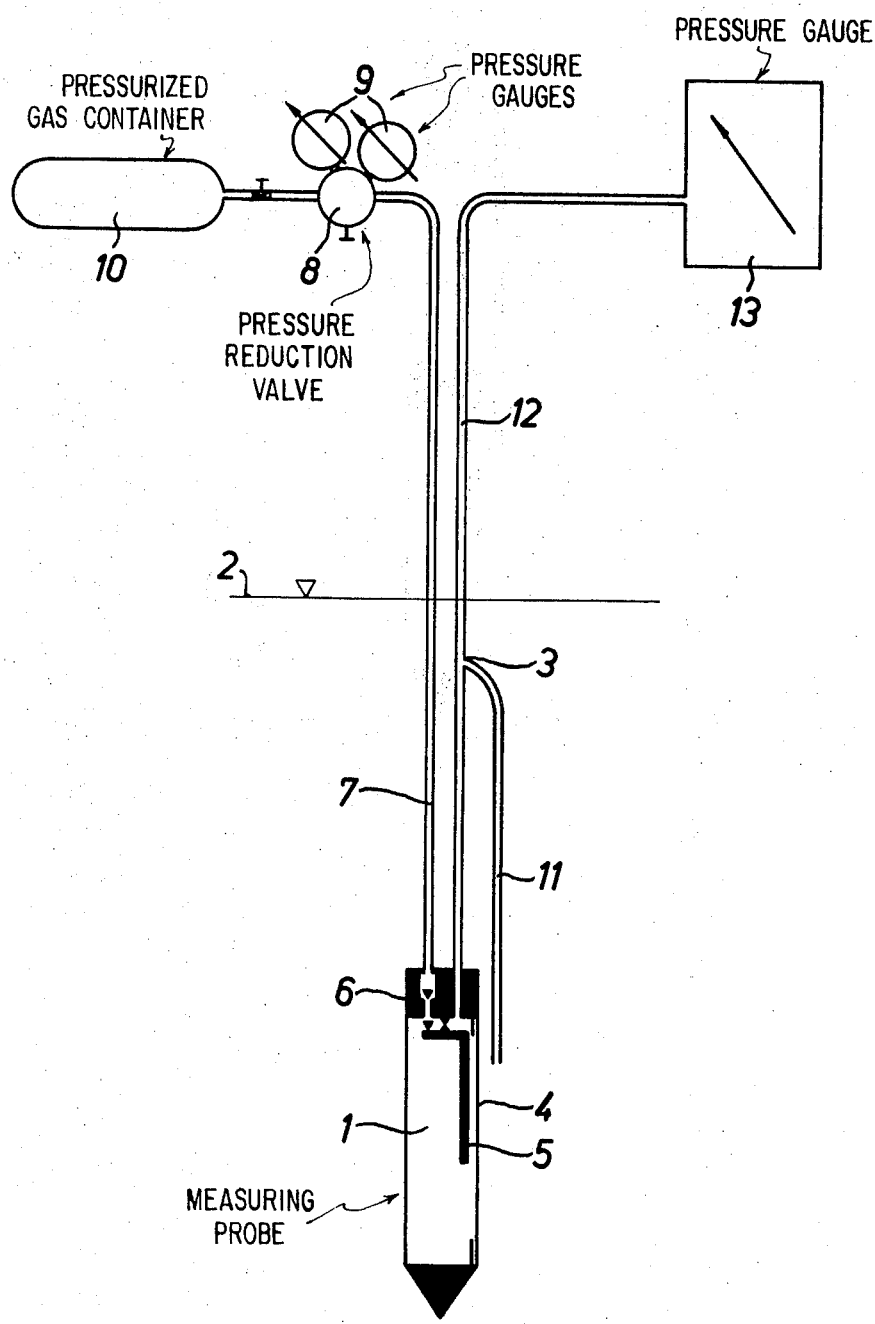

3,572,121
DEVICE FOR PNEUMATICALLY MEASURING LIQUID LEVELS
Zsolt Kesseru, Tibor Willems, and Istvan Bagdy, Budapest, Hungary, assignors to Nikex Nehezipari Kulkereskedelmi Vallalat, Budapest, Hungary
Filed Sept. 16, 1969, Ser. No. 858,377
Claims priority, application Hungary, Sept. 16, 1968, 11,827
Int. Cl. G01c 23/14
U.S. Cl. 73—302                                    1 Claim

ABSTRACT OF THE DISCLOSURE

An arrangement for measuring liquid levels by pneumatic means, equipped with a gas bottle and a measuring probe which is connected to the pipe system dipping beneath the surface of the liquid and consisting of a feed pipe and a measuring pipe, said probe controlling the supply of gas under pressure and being provided with a diaphragm.

---

For pneumatic measurements of a liquid level, numerous arrangements are known which operate by the principle of pressure balancing. Included in these are arrangements which operate with uninterrupted supply of gas, with which gas constantly discharges from the system through the pipe dipping into the liquid. As a consequence, the gas pressure of the system, disregarding the loss caused by the discharge of the gas corresponds to the liquid pressure obtaining at the terminal point of the pipe dipping into the liquid. The so-called bubbler liquid level gauges operate on this principle.

The disadvantage of these arrangements consists in that they operate slowly with a small gas yield; with higher consumption, the need for gas under pressure, the flow losses and the gas discharge energy losses are high and the measurement is inaccurate.

Measuring arrangements with a so-called closed system are also known, in which elements, such as compression cells, diaphragm cells, rubber balls and the like, which are capable of variation in volume and are arranged at a certain point of the closed system beneath the surface of the liquid, compress the gas included in the system to the degree at which the pressure corresponds to the liquid pressure in the vicinity of the compression cells. These arrangements are primarily in use for measurements of liquid levels. Their advantage consists in the simple construction. Their disadvantages lie in the small measurement range, the compression cells which occupy considerable space and the high inaccuracy of the measurement, despite the small spacing between the measurement position and the measuring instrument.

Arrangements are also known which do not require any constant air consumption. The diaphragm dipping below the surface of the liquid and in a liquid level measuring arrangement constructed in accordance with Hungarian Pat. No. 154,645 controls a pressurised gas feed valve or blow-off valve under the action of the difference in liquid pressure, either directly and mechanically or with interposition of electrical auxiliary devices, and in another constructional form, the blow-off valve is directly controlled by the pressure difference. The constructional form of this apparatus which operates with auxiliary electrical energy reaches and exceeds the accuracy of the previously mentioned arrangements, but is complicated and needs auxiliary electrical energy. Because of the blow-off valve arranged beneath the surface of the liquid, the liquid trickles through after a relatively long or short operating period. In liquids which contain viscous or solid particles, the blow-off valve operates in an unreliable manner. This constructional form is not very reliable in operation and is inaccurate.

The invention has for its object to provide a liquid level measuring arrangement without supply of gas under pressure, of which the accuracy exceeds all prior known constructional forms and which does not require any auxiliary electrical energy in the operation thereof.

This object is achieved according to the invention by the fact that a pressurised gas feed valve of the measuring probe is capable of being controlled by the diaphragm and is connected through the feed pipe conduit and a pressure-reducing valve to the pressurised gas bottle, that the measuring pipe has a branch at a point above the measuring probe and that a balancing pipe branching off from said point between the middle of the diaphragm and the liquid surface at a height corresponding to the equilibrium between the external and internal pressure opens into the liquid which is to be measured. That is, at a height corresponding to the level above which the liquid is to be measured.

By using a mechanical valve control means, the pressurised gas container can also be made independent of the measuring probe and be arranged on the surface, and simultaneously also the dimensions of the said probe can be reduced to the degree actually required. The elimination of the blow-off valve excludes the possibility of penetration of the liquid. By raising the liquid level, the feed valve increases the internal pressure to such a degree that the liquid in the balancing pipe can at most temporarily rise a few centimetres, but cannot reach the branching point. All sources of defects which are connected with the blow-off valve, including the action of the solid bodies contaminating the liquid, can be removed. The measuring probe is thus also capable of operating in liquids which contain relatively large solid bodies. As well as serving the function of the blow-off valve, the balancing pipe can also balance out the mechanical intertia of the diaphragm and of the feed valve, whereby the accuracy of the formerly reached value of ±2 cm. is improved to ±0.5 cm.

One embodiment of the invention is shown by way of example in the sole figure of the accompanying drawing and is hereinafter more fully explained.

The diaphragm 4 of the measuring probe 1 arranged below the liquid surface 2 is moved by the difference between the gas pressure inside the measuring probe and the liquid pressure. When the external pressure is higher, the membrane operates the pressurised gas feed valve 6 by means of the lever 5, said valve being connected by the feed pipe 7 and the pressure reduction valve 8, which is preferably fitted with a pressure gauge 9 on both the low-pressure and the high-pressure sides, to the pressurised gas container 10.

The internal excess pressure is able to escape through the branch 3 provided on the measuring pipe conduit 12 and through the balancing pipe 11, the terminal point of which is preferably capable of being adjusted. If the terminal point of the balancing pipe is so set that the liquid level in the balancing pipe is disposed at the terminal point of the pipe with invariable liquid level, but still no bubbles are able to escape, the balancing pipe has also balanced out the mechanical resistance of the feed valve and of the diaphragm. The gas pressure which obtains in the probe 1 and which agrees with very high accuracy to the pressure of the liquid probe situated above it can be measured by means of a pressure gauge 13 as known per se or can be recorded by means of a recording installation.

By comparison with Hungarian Pat. No. 154,645, the technical advantage of the invention consists in that, by using an exceptionally simple pneumatic mechanism, it renders superfluous the complicated auxiliary electrical devices which contain several sources of error and above all makes superfluous the use of auxiliary electrical energy, and that the dimensions of the probe according to the invention do not exceed the dimensions of the probe operating with auxiliary electrical energy and its accuracy, because the balancing pipe is used, is greater than that of the other arrangements. Consequently, it can also be used in areas in which the use of auxiliary electrical energy would be costly or in which difficulties would be met (e.g. bore holes for observing the height of water) or in which the use of electrical energy is to be avoided (e.g. when measuring the level of liquids with which the danger of fire or explosion is considerable). This solution can therefore not only be considered as more desirable than the solution according to the said Hungarian patent, but it can be used with greater advantage than any other non-electric liquid level measuring installation.

The economic advantage of the invention is considerable, since the manufacturing and operational costs are lower than those of known arrangements.

It is to be particularly emphasised that the elimination of the auxiliary electrical energy in the construction according to the invention, by contrast with the general principles of development in the field of apparatus design, represents a technical advance in the case indicated and in the solution of the given technical problem, firstly because frequently no electrical energy is available at the measuring position or this energy, even if it is available, should preferably not be used, secondly, because the construction according to the invention functions with a higher accuracy than the known arrangement operating with auxiliary electrical energy, so that it is no longer necessary to have an accuracy which exceeds that which can be achieved.

The recording signal and the recorded values can subsequently be converted by known electronic systems into digital signals, so that the measurement data can be processed with the most modern methods.

What we claim is:

1. Arrangement for measuring liquid levels by pneumatic means comprising a measuring probe connected through a first pipe and a pressure reduction valve to a source of pressurised gas, the probe containing a diaphragm actuating, under the pressure of the liquid to be measured, a valve controlling the said first pipe, and further connected through a second pipe to a pressure gauge, said second pipe having a balancing pipe which branches therefrom at a point above the measuring probe and opens into the liquid at a height corresponding to the level above which the liquid is to be measured.

References Cited

UNITED STATES PATENTS

| | | | |
|---|---|---|---|
| 1,603,162 | 10/1926 | Star | 73—302 |
| 2,067,767 | 1/1937 | Kollsman | 73—302 |
| 2,265,114 | 12/1941 | Hartley | 73—302 |
| 2,559,436 | 7/1951 | Isserstedt | 73—302 |

FOREIGN PATENTS

| | | | |
|---|---|---|---|
| 195,078 | 10/1923 | Great Britain | 73—302 |

S. CLEMENT SWISHER, Primary Examiner

UNITED STATES PATENT OFFICE
CERTIFICATE OF CORRECTION

Patent No. 3,572,121　　　　　　　　Dated March 23rd, 1971

Inventor(s) Zsolt Kesserü, Tibor Willems and István Bagdy

It is certified that error appears in the above-identified patent and that said Letters Patent are hereby corrected as shown below:

In the heading of the patent, Column 1, line 9, change "11,827" to --BA-2108--.

Signed and sealed this 6th day of July 1971.

(SEAL)
Attest:

EDWARD M. FLETCHER, JR.　　　　　　WILLIAM E. SCHUYLER, JR.
Attesting Officer　　　　　　　　　　Commissioner of Patents